Oct. 22, 1968

R. W. MILLER 3,406,768

ROCK DRILLING AUGER APPARATUS

Filed Sept. 9, 1966

INVENTOR.
ROBERT W. MILLER
BY
ATTORNEYS.

Oct. 22, 1968          R. W. MILLER          3,406,768
ROCK DRILLING AUGER APPARATUS
Filed Sept. 9, 1966                    4 Sheets-Sheet 2

INVENTOR.
ROBERT W. MILLER
BY
ATTORNEYS.

United States Patent Office 3,406,768
Patented Oct. 22, 1968

3,406,768
ROCK DRILLING AUGER APPARATUS
Robert W. Miller, Cincinnati, Ohio, assignor to Alaskaug, Inc., Cincinnati, Ohio, a corporation of Ohio
Continuation-in-part of application Ser. No. 370,997, May 28, 1964. This application Sept. 9, 1966, Ser. No. 594,639
4 Claims. (Cl. 175—162)

ABSTRACT OF THE DISCLOSURE

The invention is an apparatus for drilling rock, comprising an S-type auger bit disposed substantially normal to the rock formation being drilled, in combination with means to apply a steady load to the bit and means operable to modify the steady load to vary the pressure exerted against the rock intermittently in pulses at a rate which causes irregular areas to be chipped away from the annular steps normally created by the operation of the bit, thus materially increasing speed and efficiency of the drilling.

---

This invention relates to the art of drilling rock and is particularly concerned with drilling rock, concrete or other difficultly penetrable surfaces imbedded in the earth's surface. The invention is concerned specifically with an apparatus and method for drilling into such surfaces with stepped augers of the general type described in the patent to Henning 2,731,237 dated Jan. 17, 1956, in which substantial down pressure is exerted on the auger from above and the auger rotated to bore into the rock in a series of circular concentric paths at levels corresponding to the placement of the individual bits on the steps of the auger. This application is a continuation-in-part of my application, Ser. No. 370,997, filed May 28, 1964, now abandoned.

Briefly described, the apparatus of my invention may be described as comprising a fixed base or frame, an auger mounted in said frame, the auger having cutting bits spirally arranged in steps, means for rotating said auger, means mounted on said frame for exerting a unidirectional force from said frame along the axis of said auger, and means for superimposing on said auger an additional force in periodic pulses.

The invention may also be described as providing means for modifying a unidirectional force as by permitting the force to build up, suddenly relieving it, and immediately reapplying it.

The novel method may be briefly described as comprising rotating a stepped auger on its axis under a unidirectional force or pressure along its axis and simultaneously superimposing an increased force or pressure along its said axis in periodic pulses. The method may also be viewed as comprising loading a stepped auger bit unsteadily with a load or down pressure which, on a time average basis, is equivalent to the maximum steady load.

In the art of oil drilling it has heretofore been suggested to provide means for longitudinally vibrating a rotating drill rod within the well hole. Various means and mechanisms have been devised for this purpose, and elaborate theories have been advanced for the apparent increased efficacy of an oil drilling rig provided with such means. This procedure, however, has always been accomplished by hanging the drill string in the well hole and placing the power generator for producing the desired virbrations within the well hole. The drill string is in effect rattled up and down in the well hole and periodically knocks against the rock, much like a hand-operated star drill. Moreover, the type of holes bored with such apparatus are generally relatively small, 9" in diameter or less, and the effect of such longitudinal vibration (sometimes termed oscillatory percussion) has been confined to the work that these relatively small drill bits do within this restricted area.

According to the present invention drilling of relatively large holes is accomplished with a stepped auger with a unidirectional pressure generated positively from a fixed foundation and exerted directly along the vertical axis of the bit. The means for exerting pressure down upon or along the axis of the bit is secured to a fixed framework firmly set into or onto the surface of the earth from which the drilling operation is begun and thus provides a firm base upon which and within which to absorb the reactive forces generated during the drilling operation.

I have found that the effectiveness of drilling into various rock formations with a stepped auger upon which a steady "down pressure" is exerted can be increased many fold by the periodic superimposition of additional pressure pulses on said auger. The optimum amount of superimposed pressure and the frequency thereof will of course depend upon the type of rock in which the boring is to be made, the speed of the drill, the power applied thereto, and the limitations of the hydraulic or other load-applying system. I have found, however, that with large stepped augers of 24" and 36" diameter and larger, the superimposition of pulses of additional pressure on an auger already subject to a steady pressure greatly increases the efficacy of the bits which tend to break the rock inwardly and away from the different lands formed during stepped auger drilling and results in a marked increase in the rate of penetration over that which can be accomplished by applying a steady "down pressure" alone.

I have found that the secondary pulses applied are advantageously of a greater magnitude than those forces applied by the steady pressure.

I have also found that the frequency of these pulses is advantageously maintained relatively low, of the order of 30 to 60 per minute. At a frequency of 120 per minute the efficacy of unsteady loading falls off rapidly and is almost indistinguishable from steady loading.

With a portable rig I have found that in drilling with steady pressure within the capability of the system, there is a tendency for the rig to jump or chatter due to the impact of the bits spinning and cutting in the rock. Surprisingly, this chatter is obviated when an additional pressure is pulsed into the system. Accordingly, the invention permits the achievement, with relatively light portable equipment, penetration rates which are typical of much heavier equipment, and increased rates where heavier and more rugged equipment is used.

A principal object of the invention is to provide a means for and method of greatly increasing the rate of penetration at which the auger drilling of rock and similar material can be accomplished.

A further major object is to provide a means and method by which such increased rates can be achieved with relatively light, portable equipment.

The novel features that are considered characteristic of the invention are set forth in the appended claims. The invention itself, however, both as to its organization and method of operation, together with additional objects and advantages thereof, will be understood from the following description of a specific embodiment when read in conjunction with the accompanying drawing in which:

Figure 1:
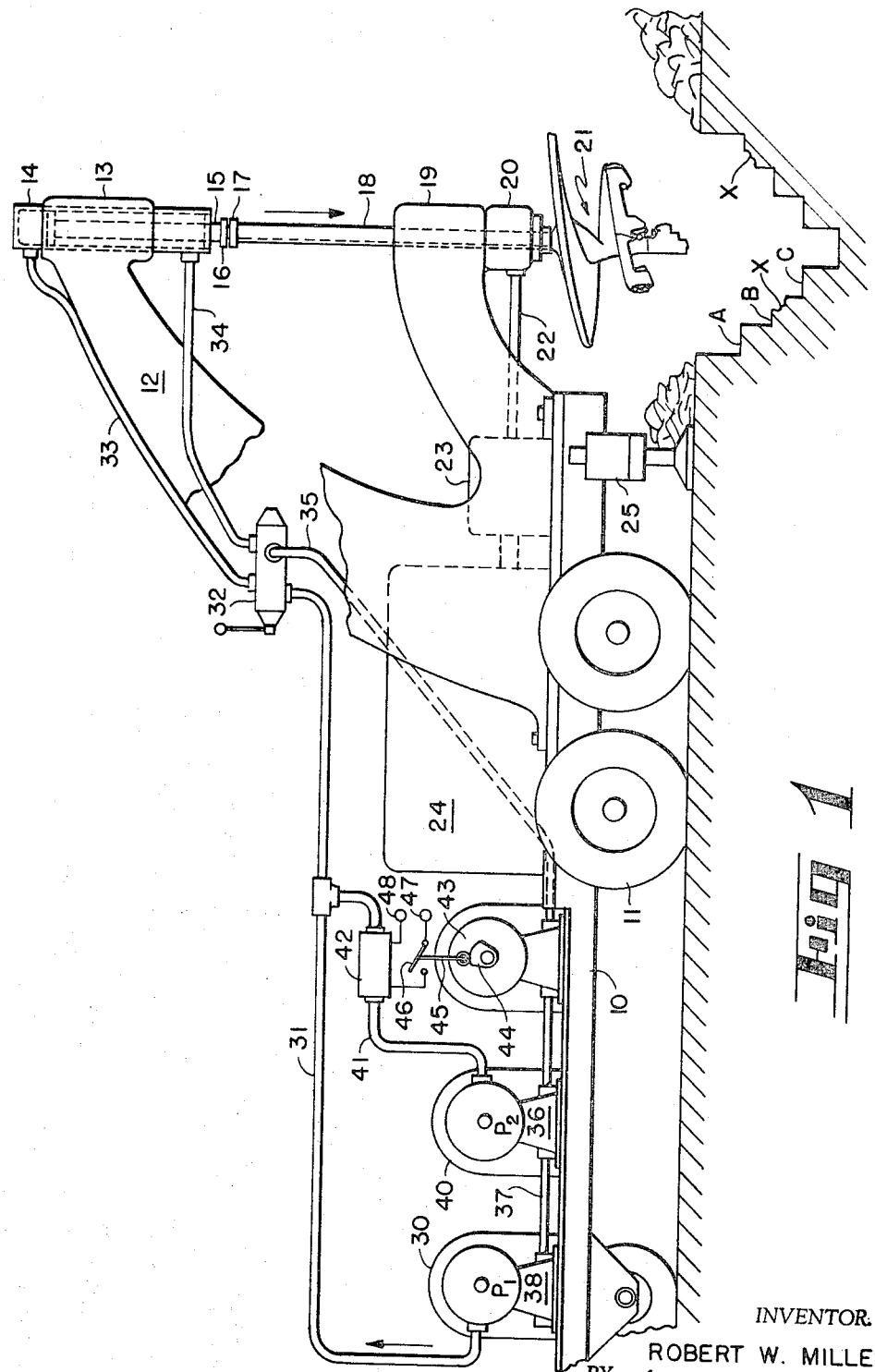
FIG. 1 is a side elevation with certain parts shown diagrammatically of a portable drill rig embodying the invention, designed to bore vertically oriented holes.

Referring to the drawings, a drill rig comprising a frame 10 may be conventionally mounted on wheels 11. Secured rearwardly of the frame of the rig is a heavy and massive mounting 12 comprising a topmost arm 13 in which is supported a hydraulic cylinder 14. Depending from the bottom of the cylinder is a piston rod 15 to which is secured a thrust bearing 16 arranged to exert a downward vertical thrust against bearing 17 to which is attached a Kelly bar 18. Kelly bar 18 is journaled for longitudinal and rotary movement in a suitable bearing in the lower arm 19 of the mounting. Below this bearing is a gear box 20 arranged to impart rotary movement to the torque bar of the stepped auger 21, shown only diagrammatically in FIG. 1, but illustrated in perspective in FIG. 2. Power is supplied to gear box 20 through shaft 22 by motor 23 which may be suitably supplied with power from motor generator set 24. Conventional jacks 25 are provided in order to provide a firm base from which the drilling operation can proceed.

In the illustrative embodiment of FIG. 1 hydraulic pressure is applied to cylinder 14 through a primary system comprising a pump 30, high pressure line 31, control 32, feed line 33, return lines 34 and 35, to the low side 38 of pump 30. A second hydraulic pump 40 feeds high pressure fluid through line 41 through solenoid operated valve 42 into line 31. Return line 35 to the low side 38 of pump 30 is intermediately connected to the low side 36 of the secondary pump 40 and the low sides of each pump are interconnected through conduit 37. In the illustrative embodiment the pumps 30 and 40 provide three gallons per minute at 2000 pounds per square inch and may be actuated by five horsepower motors.

In order to produce an intermittent superimposed pressure upon the primary system I provide a motor 43, having a shaft to which is secured a cam 44 operating through a suitable cam follower on connecting rod 45 secured to a switch 46 in electric circuit 47, 48 connected to solenoid valve 42. The switch 46 is pivoted to open and close the circuit and to energize and deenergize the solenoid valve 42. By varying the speed of the motor 43 I can vary the rate at which valve 42 opens and closes. When it opens it opens the secondary system into the primary system and controls the frequency of the pulses superimposed upon the primary system. I have found that variations of between 30–60 cycles per minute are advantageous for most rock drilling, the precise frequency being dependent upon one or more of the known variables that must be reckoned with in this field of endeavor.

Figure 4:
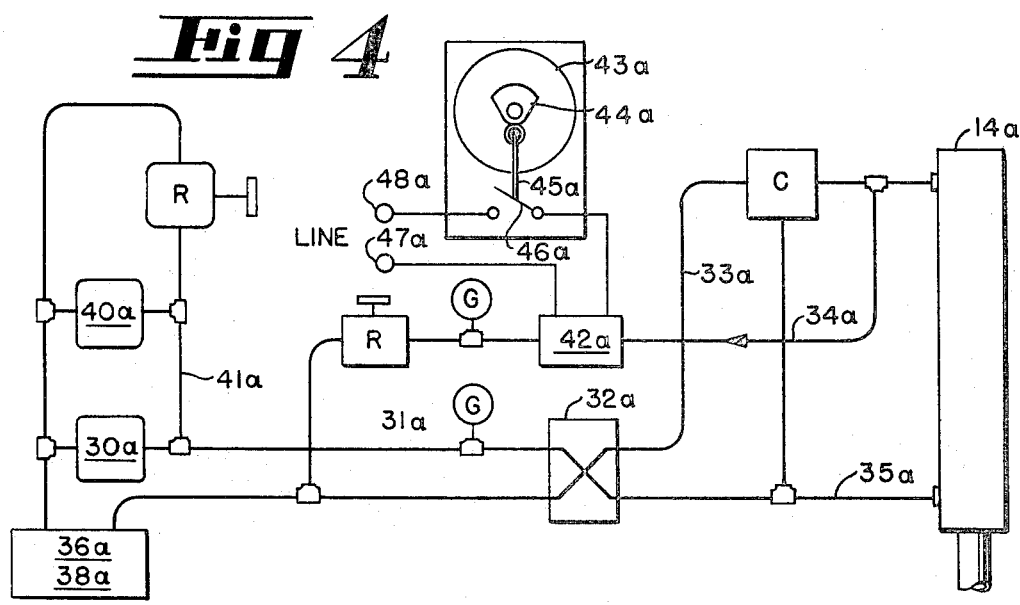
FIG. 4 is a schematic view of an alternative way in which the hydraulic system may be connected in order to provide a high flow rate to load the hydraulic cylinder.

An alternative hydraulic hook-up is disclosed in FIG. 4 in which pumps 30a and 40a are ganged together to provide a high flow rate to load cylinder 14a. The various parts of the system are similar to those depicted in FIG. 1 but are designated with the reference letter a. Variable relief valves R may be provided as well as a suitable check valve C and pressure gages G in order to more effectively control the system.

Figure 6:
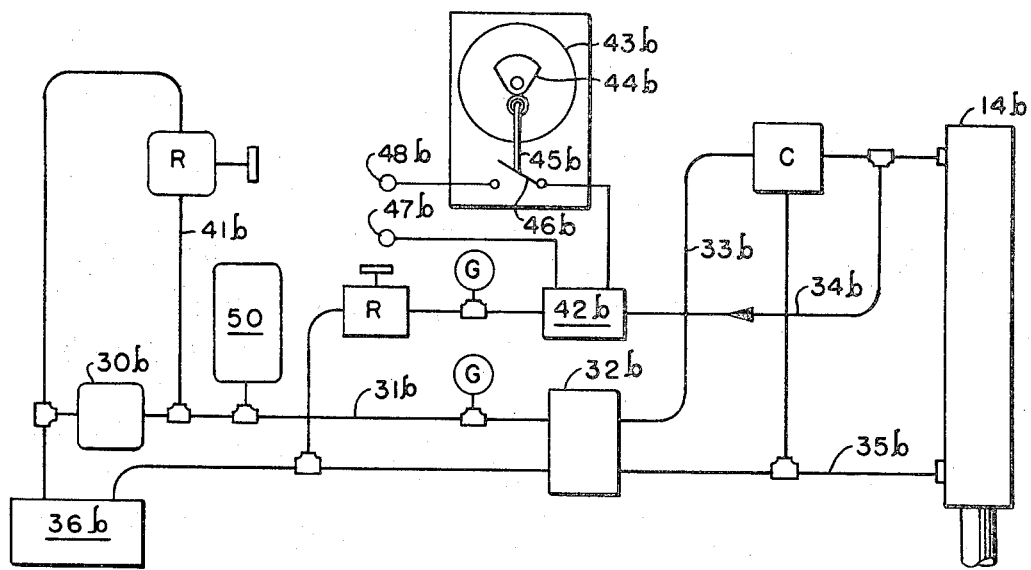
FIG. 6 is a diagrammatic view of an alternative way in which the hydraulic system may be connected.

A second alternative system is shown in simplified form in FIG. 6, in which the various parts of the system described in connection with FIG. 4 are distinguished by the letter b. In this arrangement I use a single hydraulic pump 30b and insert an accumulator 50 in the high pressure side of the system. The pump 30b charges the accumulator 50 which establishes a predetermined hydraulic pressure for the system. Solenoid valve 42b suddenly and periodically relieves the pressure and immediately reapplies it when the cam 44b operates switch 46b to energize and deenergize valve 42b. Hydraulic fluid under pressure is thus supplied to cylinder 14b and the pressure is periodically relieved when the solenoid valve 42b operates to close the hydraulic circuit. The hydraulic fluid returns to the pump through reservoir 36b.

Figure 2:
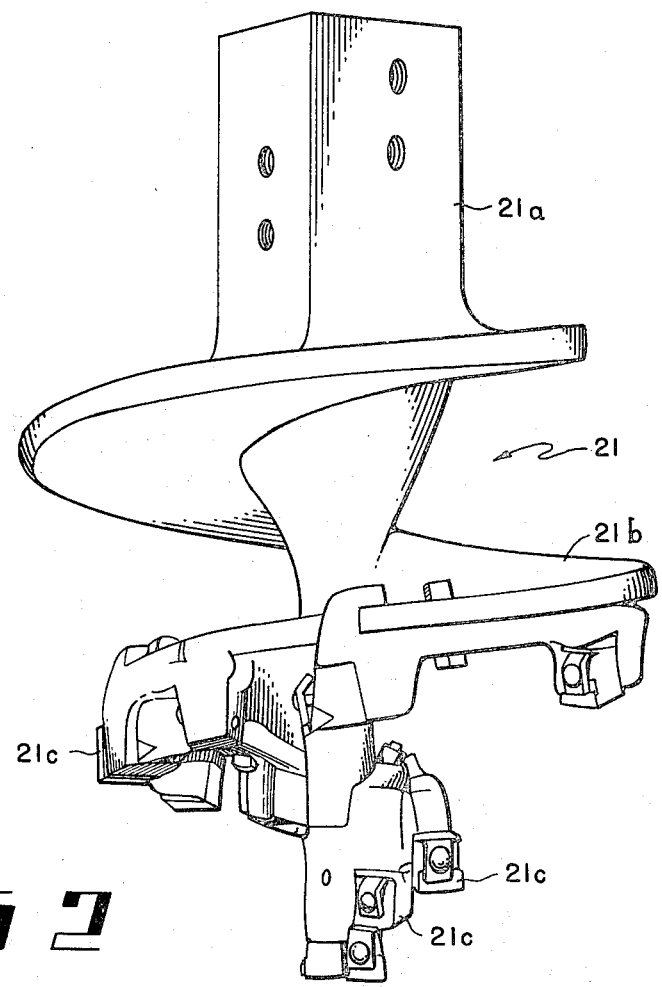
FIG. 2 is a side elevation showing a stepped auger of the type to be used with such a rig to accomplish the purposes of the invention.
Figure 3:
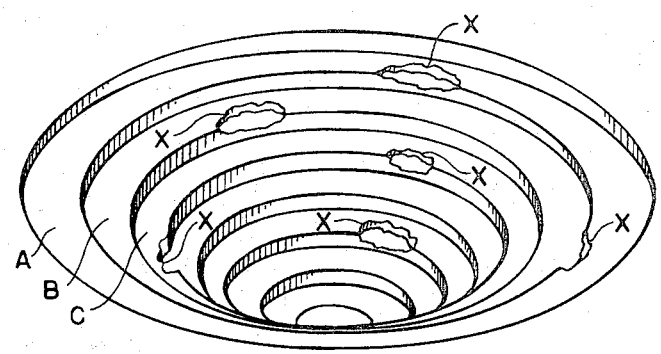
FIG. 3 is a perspective view of a vertically bored hole partially drilled in the rock showing the stepped down crater formed when drilling rock with a stepped auger and in which the rock is cut away to form a remainder of narrow ledges.

An illustrative stepped auger which can be advantageously used with my invention is of the type shown in detail in FIG. 2, comprising a torque bar 21a, a spiral auger flight or flange 21b provided with steps upon which are mounted a series of carbide bits 21c, at different radial distances from the center line of the auger and in different horizontal planes. The bits, mounted securely in the steps of the auger by means which are not a part of the present invention, present a stepped attitude to the rock and after drilling is commenced, produces a series of annular steps in the bottom of the hole as shown in FIGS. 1 and 3, comprising lands A, B and C.

An example of my process was carried out on massive dolomite with a 36″ auger rotating at 20 r.p.m. with a steady down pressure of 4000 lbs. on the primary system. With this set-up I achieved a penetration of about 3/8″ per minute. When additional pressure of 8000 lbs. was introduced into the secondary system 41, 42, in pulses at a frequency of 200 cycles per minute, the rate of penetration was increased to 2″ per minute or more than a five-fold increase. Later tests showed that the frequency of 200 per minute could have been decreased considerably.

I have found that steady pressure of four tons can be effectively supplemented by pulses as high as eight to twelve tons in order to achieve greatly increased rates of penetration.

Figure 5:
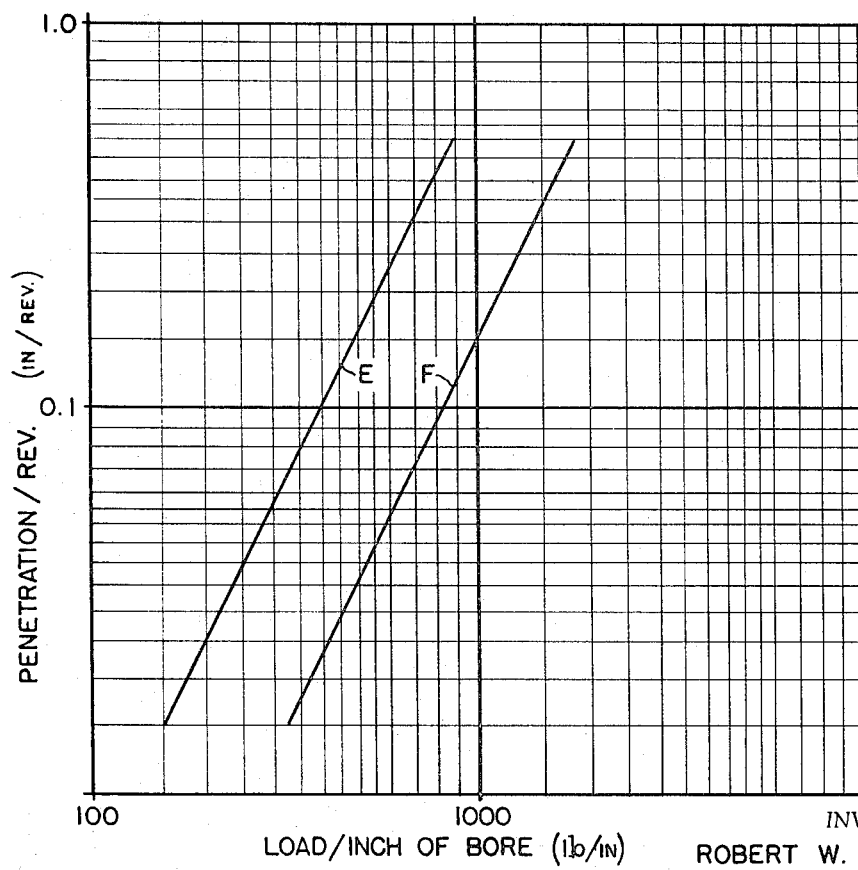
FIG. 5 is a chart showing the results of drilling tests on Indiana limestone in which unsteady loading in accordance with the invention was compared with steady loading.

In tests conducted with the apparatus of the invention on Indiana limestone, using a 24″ two-flight auger, the penetration in inches per revolution was measured against the load in pounds per inch of bore. These tests were carried out for both steady and unsteady (pulsating) loading, using the same time-average equivalent loading. The results were recorded and plotted on log-log paper as shown in FIG. 5. As will be noted, substantial increased penetration was obtained for the same load per inch of bore by utilizing the principles of the present invention.

I am unable to determine the precise physical explanation of these phenomena but I believe that the marked increase in penetration is obtained by the chipping of the rock inwardly from the lands in large irregular areas designated X in FIG. 3, which reduces materially the remaining area upon which the cutting bits work. These chips are quickly thrown up onto the auger flange and brought up to the surface in the spoil.

It should be understood that the illustrative embodiment showing vertical drilling is not intended to limit my invention since equivalent forces can be generated in horizontal or intermediate planes.

Having thus described my invention, I claim:

1. A rock drilling apparatus comprising in combination, a frame, an auger mounted on said frame, and having a helical flange, drill bits secured to the lower portions of said flange at varying distances from the axis and in different horizontal planes, means for rotating said auger about said axis, means for disposing said auger with its axis extending substantially normal to the rock formation to be drilled, means for applying a steady load to said auger along said axis so that the bits bite into said rock in concentric circular paths as the auger is rotated and is pressed thereagainst by said steady load, and means operable upon said steady loading means to modify said steady load to vary the pressure exerted against said rock intermittently in pulses, whereby the rock is removed in annular steps coincident with the position of said bits, and irregular areas are simultaneously chipped from said steps and removed by the auger flange as spoil, thereby aiding the effectiveness of the drilling operation and increasing the rate at which it is accomplished.

2. The apparatus of claim 1 in which the time-average load generated by said modifying means is less than the weight of the entire apparatus.

3. The apparatus of claim 1 in which the pulsing rate is maintained at from 30 to 60 cycles per minute.

4. The apparatus of claim 1 in which the magnitude of the pulses is substantially greater than the magnitude of said steady load.

References Cited

UNITED STATES PATENTS

| | | | |
|---|---|---|---|
| 2,102,236 | 12/1937 | Johansen | 175—56 X |
| 2,103,137 | 12/1937 | Basgan | 175—56 |
| 2,259,807 | 10/1941 | Edwards et al. | 175—56 X |
| 2,554,005 | 5/1951 | Bodine | 175—56 X |
| 2,672,322 | 3/1954 | Bodine | 175—56 |
| 2,731,237 | 1/1956 | Henning | 175—391 |
| 2,743,083 | 4/1956 | Zublin | 175—56 |
| 2,797,066 | 6/1957 | Sewell | 175—122 |
| 2,856,155 | 10/1958 | Putt | 173—150 X |
| 2,942,849 | 6/1960 | Bodine | 175—55 |

CHARLES E. O'CONNELL, *Primary Examiner.*

R. E. FAVREAU, *Assistant Examiner.*